US00RE43695E

(19) United States
(12) Reissued Patent
Baenziger et al.

(10) Patent Number: US RE43,695 E
(45) Date of Reissued Patent: Oct. 2, 2012

(54) LEVEL WIND MECHANISM

(76) Inventors: Robert C. Baenziger, Phoenix, AZ (US); Casey J. Childre, Foley, AL (US)

(21) Appl. No.: 12/561,716

(22) Filed: Sep. 17, 2009

Related U.S. Patent Documents

Reissue of:
(64) Patent No.: 7,270,288
Issued: Sep. 18, 2007
Appl. No.: 11/451,044
Filed: Jun. 12, 2006

U.S. Applications:
(63) Continuation-in-part of application No. 11/184,759, filed on Jul. 19, 2005, now abandoned.

(51) Int. Cl.
*A01K 89/015* (2006.01)
(52) U.S. Cl. ..... 242/274; 242/273; 242/241
(58) Field of Classification Search ..... 242/273, 242/274, 277–279, 241, 242
See application file for complete search history.

(56) References Cited

U.S. PATENT DOCUMENTS

| | | | | | |
|---|---|---|---|---|---|
| 1,438,007 | A * | 12/1922 | Welch | ..... | 242/277 |
| 1,507,404 | A * | 9/1924 | Welch | ..... | 242/277 |
| 1,649,154 | A * | 11/1927 | Curdy | ..... | 242/274 |
| 1,973,686 | A * | 9/1934 | Maynes | ..... | 242/274 |
| 2,027,305 | A * | 1/1936 | Maynes | ..... | 242/274 |
| 2,338,126 | A * | 1/1944 | Maynes | ..... | 242/274 |
| 2,512,357 | A * | 6/1950 | Maynes | ..... | 242/274 |
| 2,609,161 | A * | 9/1952 | Guhlin et al. | ..... | 242/277 |
| 3,045,943 | A * | 7/1962 | Forrester | ..... | 242/273 |
| 3,464,646 | A * | 9/1969 | Odom | ..... | 242/274 |
| 4,770,362 | A * | 9/1988 | Effinger | ..... | 242/312 |
| 6,446,895 | B1 * | 9/2002 | Baenziger et al. | ..... | 242/277 |
| 6,830,209 | B1 * | 12/2004 | Baenziger et al. | ..... | 242/278 |

* cited by examiner

*Primary Examiner* — Emmanuel M Marcelo
(74) *Attorney, Agent, or Firm* — Cook Alex Ltd.

(57) ABSTRACT

A fishing reel with side walls includes a spool shaft rotatably supported therebetween and a level wind comprising a transverse shaft with an oblique segment intermediate the ends of the shaft rotatably secured between the side walls in front of the spool that engages the fishing line as it is being wound onto the spool.

12 Claims, 4 Drawing Sheets

LEVEL WIND MECHANISM

Matter enclosed in heavy brackets [ ] appears in the original patent but forms no part of this reissue specification; matter printed in italics indicates the additions made by reissue.

CROSS-REFERENCE TO RELATED APPLICATION

The present application is a continuation-in-part of U.S. Ser. No. 11/184,759, filed Jul. 19, 2005 now abandoned and which is incorporated by reference herein.

BACKGROUND

The present invention relates to a bait casting fishing reel and, more particularly, to an improved level wind mechanism forming a part of a bait casting reel.

The bait casting fishing reel has become the reel of choice among skilled fisherman, particularly when used for surf casting, deep sea fishing and bass fishing. Skilled anglers find that they can more accurately cast with a bait casting reel than with a spinning or spin casting reel.

Bait casting reels typically include a level wind mechanism located in front of the reel to help to insure that the fishing line is evenly wound upon the spool as it is reeled in. The general design of the level wind mechanism has remained unchanged for over 100 years. See, e.g., U.S. Pat. No. 2,204,125 to Dayton. This patent discloses a level wind mechanism that employs a screw or shaft mounted between the reel side plates for rotation in parallel alignment with the spool. The shaft comprises a worm gear that has a continuous thread cut in both directions so that the thread crosses back on itself multiple times along the axis of the shaft. The shaft includes a sleeve, block or equivalent structure slidingly mounted thereon that includes a pawl or claw that engages the continuous thread so that, as the shaft is rotated by means of the handle, the sleeve traverses back and forth in front of the full width of the spool. The sleeve also supports a line guide through which the fishing line is threaded. Accordingly, the line guide moves back and forth in front of the spool as the line is wound in to evenly distribute the line on the spool.

The level wind is a comparatively complicated mechanism requiring several small parts and precise machining, particularly for the threads of the worm gear. The worm gear is especially susceptible to wear at the cross-over points of the continuous thread and, consequently, to malfunctioning. The continuous thread is also subject to fouling from various elements, as it is exposed to the elements, including dirt, sand and salt spray, and runs very loose tolerances due to the pawl having to turn around at the ends of the worm gear. In contrast, the other gear sets in a reel enjoy a closed environment with tight tolerances.

Due to these reliability issues, many salt water reels do not include a level wind, thus requiring the user to manipulate the line by hand in an attempt to evenly wind the line along the spool. The level wind mechanism is also one of the more expensive components of the reel assembly and requires major disassembly to repair, and its complexity makes it virtually impossible to repair in the field.

Accordingly, it is the principal object of the present invention to provide for a fishing reel having a simplified level wind mechanism.

More specifically, it is an object of the present invention to provide a level wind mechanism that is simple to manufacture, long wearing, and easy to install.

Further, it is an object of the present invention to provide a simplified level wind that evenly winds the finishing line on the spool as it is being reeled in.

SUMMARY OF THE INVENTION

These objects, as well as others which will become apparent upon reference to the accompanying drawings and following description, are provided by a fishing reel with side walls with a spool shaft rotatably supported therebetween. The spool shaft supports the spool that holds the fishing line. A handle shaft is provided that includes a driving gear that engages a pinion on the spool shaft for winding in the fishing line upon the spool.

A generally transverse shaft is rotatably secured between the side walls in front of the spool. The transverse shaft is adapted to be rotated by the driving gear, and, in keeping with the invention, the transverse shaft includes collars with opposed planar parallel faces at the opposite ends thereof, the planar faces being disposed obliquely or diagonally with respect to the axis of the transverse shaft. Preferably, the collars are generally cylindrical and the planar faces are generally elliptical.

In another aspect of the invention, the transverse shaft includes a central segment that is disposed between the collars obliquely with respect to the axis of rotation of the transverse shaft, and a transition segment between each opposed end of the central segment and its respective collar such that each transition segment defines a line-engaging surface that is oblique or diagonal to both the planar faces of the collars and the central segment and is parallel to the line-engaging surface of the other transition segment. The transition segments may either be coplanar with the axis of *rotation of* the [central segment] *transverse shaft*, or define parallel planes to which the axis of the rotation of the transverse shaft is also parallel. As the fishing line comes off the spool it may be strung either underneath or over the transverse shaft, depending on its location. With the rotation of the transverse shaft, the central segment presents oscillating high and low points between which the fishing line migrates as it is being reeled in, while the transition segments cause the line to be wound evenly on the spool. Thus, by way of the present invention, a level wind is provided in which the worm gear, as well as the block and line eyelet that are mounted thereon, are eliminated.

In a further aspect of the invention, the central segment is disposed substantially perpendicularly with respect to the opposed planar parallel faces of the collars.

BRIEF DESCRIPTION OF THE DRAWINGS

The invention is illustrated diagrammatically in the following drawings wherein.

DETAILED DESCRIPTION OF THE PREFERRED EMBODIMENT

Figure 1:
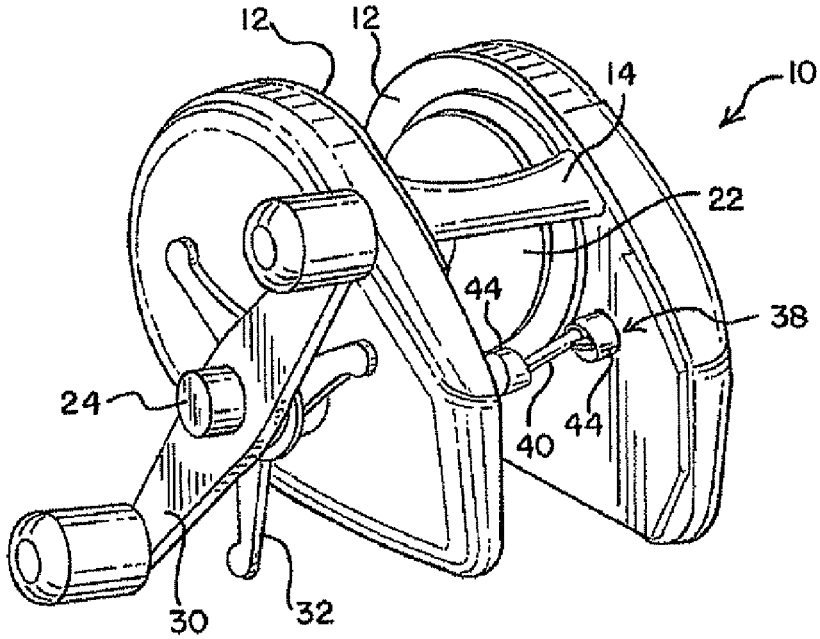
FIG. 1 is a perspective view of a bait casting fishing reel incorporating a level wind mechanism according to a first embodiment of the present invention.
Figure 2:
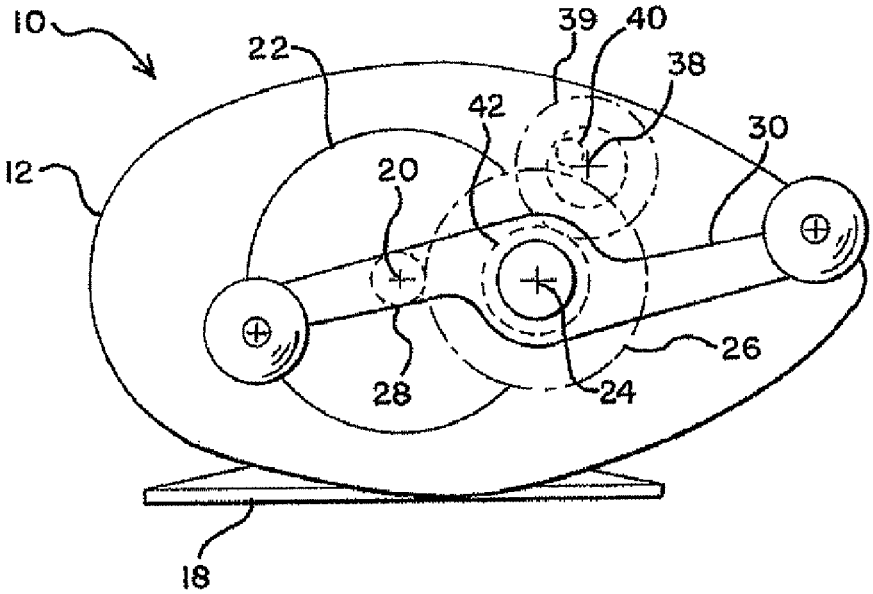
FIG. 2 is a side view of a fishing reel according to the present invention showing a conventional drive mechanism for the level wind.

Turning to FIGS. 1 and 2, there is seen a bait casting fishing reel, generally designated 10, according to the present invention. As is well known, the reel 10 includes two opposed side walls 12 typically joined together in spaced relationship by upper and lower cross-members 14, best seen in FIG. 3. The lower cross-member supports a foot or rod mount 18 to facilitate securing the reel 10 to a fishing rod (not shown).

A spool shaft 20 (best seen in FIG. 2) is rotatably supported between the side walls 12. Spool 22, which is secured to the spool shaft 20, holds the fishing line. To rotate the spool 22 for reeling in the fishing line, the reel 10 has a handle shaft 24 that includes a driving gear 26 that selectively engages a pinion 28 mounted on the spool shaft 20. A crank handle 30 is secured to the handle shaft 24 to facilitate the rotating of the handle shaft by the fisherman. A drag adjustment 32 may also be provided, as is well known in the art.

A novel level wind mechanism is provided for winding the fishing line evenly upon the spool 20 as the line is reeled in. Unlike the typical level wind, no worm gear or line guide is required, thus greatly simplifying structure of the level wind and enhancing its reliability.

The level wind comprises a generally transverse shaft 38 rotatably supported about its longitudinal axis between the side walls 12 in front of the spool 22. The shaft 38 includes a gear 39 that is engaged by a gear 42 on the handle shaft 24 so that the shaft 38 may be rotated about its longitudinal axis upon rotation of the crank handle 30, the spool shaft 20/spool 22 being simultaneously rotated in a direction to reel in the fishing line. Alternatively, a Geneva motion mechanism employing a star wheel and drive pin may be used to rotate the transverse shaft, as shown in our prior U.S. Pat. No. 6,446,895, which is incorporated by reference herein.

Figure 3:
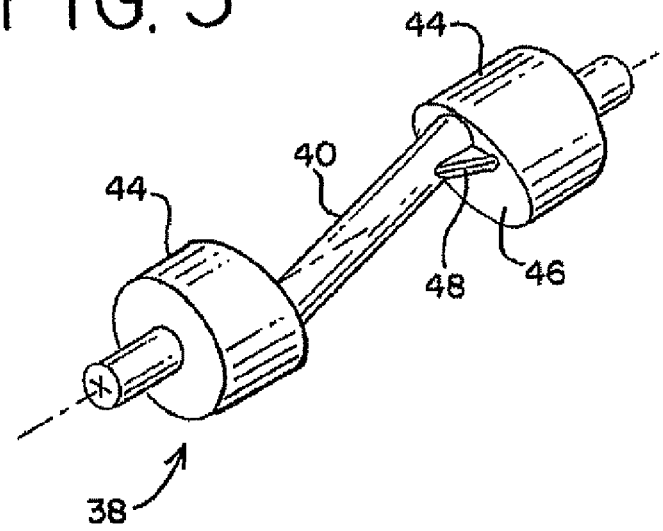
FIGS. 3-5 are, respectively, enlarged perspective, front and top views of a first embodiment of a level wind according to the present invention.
Figure 5:
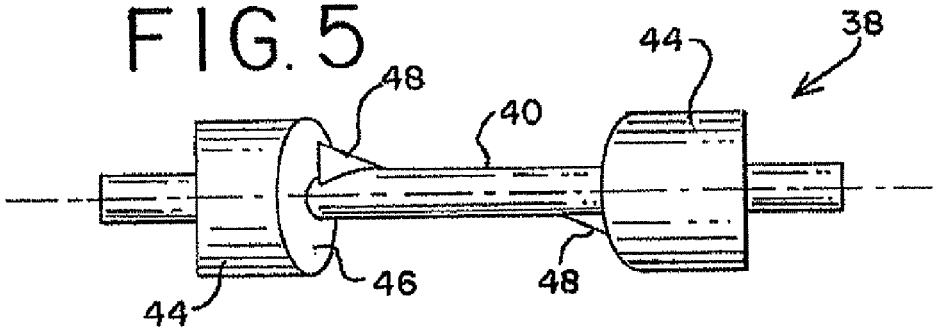
Figure 4:
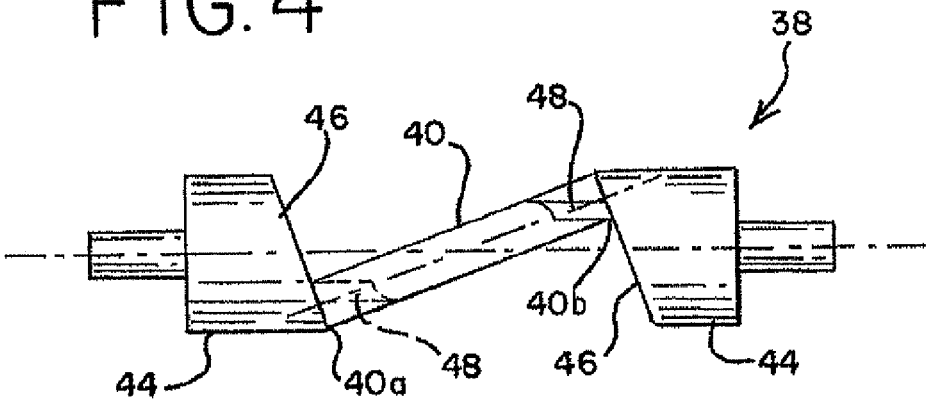
Figure 6:
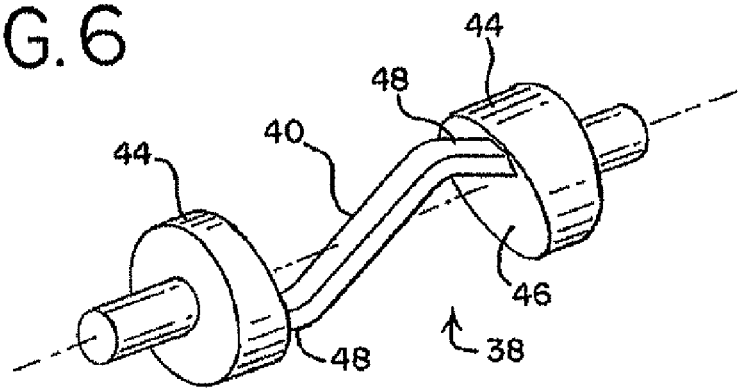
FIGS. 6-9 are, respectively, enlarged perspective, front, top and end views of a second embodiment of a level wind according to the present invention.
Figure 8:
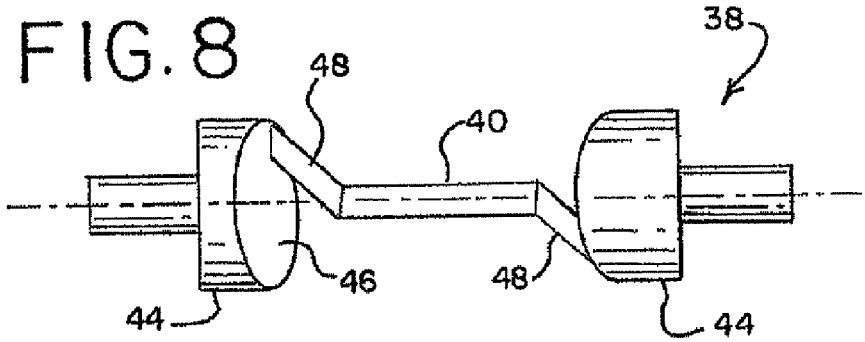
Figure 7:
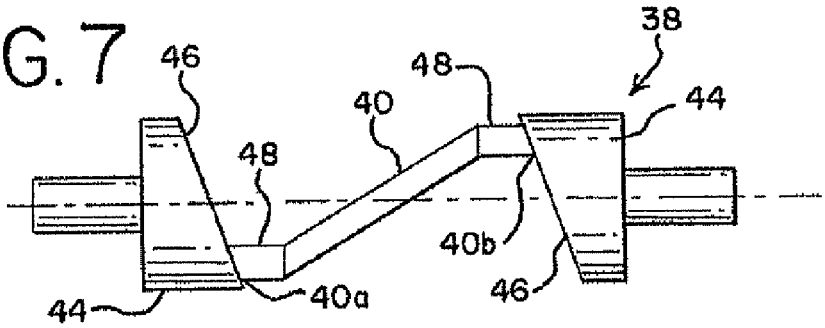
Figure 9:
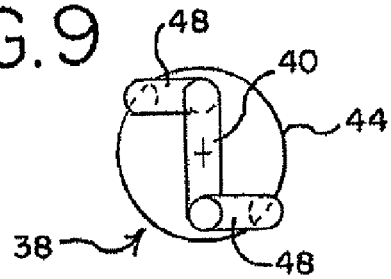

Turning to FIGS. 3-5, a first embodiment of a transverse shaft 38 comprising a level wind in accordance with the present invention is shown. In keeping with the invention, the transverse shaft 38 includes central segment 40 disposed in front of the spool and extending between the two side walls 12 obliquely or diagonally with respect to the axis of the rotation of the shaft. As the fishing line comes off the spool, it may pass either under or over the shaft 38, depending on the location of axis of rotation of the transverse shaft 38 relative to axis of rotation of the spool shaft 20, but will typically pass under the shaft 38. The oblique segment 40 presents a line-engaging surface having high and low points 40a, 40b at opposite ends thereof between which the fishing line migrates. The high and low points 40a, 40b move alternately from side to side in front of the spool as the transverse shaft 38 rotates, thus moving the fishing line back and forth to wind it evenly on the spool.

As seen in FIGS. 3-5, the central segment 40 comprises a substantially straight member extending between opposed collars 44. The angle at which the central segment is disposed with respect to the axis of rotation of the transverse [haft 48] *shaft 38* is dependent upon the rate of rotation of the transverse shaft [48] *38* relative to the rate of rotation of the spool shaft: the faster the speed of rotation of the transverse shaft [48] *38*, the higher the angle. The collars 44 have planar interior faces 46 that are parallel with respect to each other and disposed obliquely or diagonally ("sloped") with respect to the axis of rotation of the shaft 38 so that the central segment 40 extends substantially perpendicularly to the interior faces of the collars (best seen in FIG. 4). The collars 44 have a generally cylindrical shape and, consequently, the planar faces 46 of the collars 44 have a generally elliptical shape. However, the planar faces 46 need not be of any particular shape. The sloping planar faces 46 function to restrict the travel of the fishing line to the central oblique segment 40 of the transverse shaft 38. Without the sloping planar faces 46, the fishing line would tend to wind over the collars 44.

In keeping with an aspect of the invention, transition segments 48 are provided between the opposed ends of the central segment 40 and the faces 46 of the collars 44. As best seen in FIGS. 3 and 5, the transition segments 48 create line-engaging surfaces that are parallel with respect to each other and oblique or diagonal with respect to both the axis of rotation of the transverse shaft 38 and the central segment 40. The transition segments 48 may define parallel planes to which the axis of the rotation of the transverse shaft 38 is also parallel (as seen in FIG. 4) or the transition segments 48 may be coplanar with the longitudinal axis of the [central segment 40] *transverse shaft 38*.

The transition segments 48 are oriented so that when the central segment 40 presents the high and low points 40a, 40b (i.e., the central segment is in a vertical plane as seen in FIG. 4, and the fishing line is urged to the high point 40b), the transition segments 48 lie in a horizontal plane. As the transverse shaft 38 rotates the central segment past the vertical plane, a transition segment 48 immediately engages the line to urge it toward the other side of the spool. Otherwise, in the absence of the transition segments, the fishing line would tend to stay at the collar until the transverse shaft has rotated 90 degrees past vertical (i.e., the central segment 40 lie in the horizontal plane, as seen in FIG. 5), and the central segment 40 starts to urge the fishing line toward the opposite side of the spool. Thus, the transition segments 48 help to ensure that the fishing line is wound evenly across the spool rather than accumulating primarily at the opposite sides of the spool.

A second embodiment of a transverse shaft 38 comprising a level wind in accordance with the present invention is shown in FIGS. 6-9. This embodiment differs from that shown in FIGS. 3-5 in that the central segment 40 terminates where the transition segments 48 begin, rather than extending fully between the opposed planar faces 46 of the collars 44, as in the first embodiment. Otherwise, the transverse shaft of FIGS. 6-9 presents line-engaging surfaces that are oriented with respect to the axis of rotation of the transverse shaft that are the same as those in the first embodiment. Accordingly, identical reference numerals are used with respect to the embodiment shown in FIGS. 6-9 and that shown in FIGS. 3-5.

The transverse shaft can be made by well-known compression or injection molding techniques. Further, a greater range of acceptable materials may be used in its manufacture, including ceramics, aluminum, brass and plastics, such as nylon or delrin. Such materials provide for a transverse shaft that is corrosion proof and for which no lubrication is needed.

Figure 10:
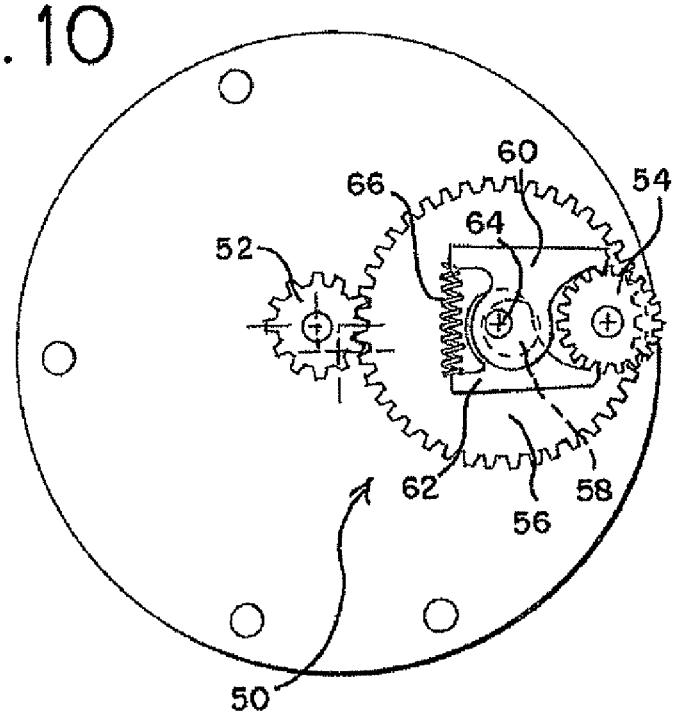
FIGS. 10 and 11 are side and exploded views of a level wind drive mechanism.
Figure 11:
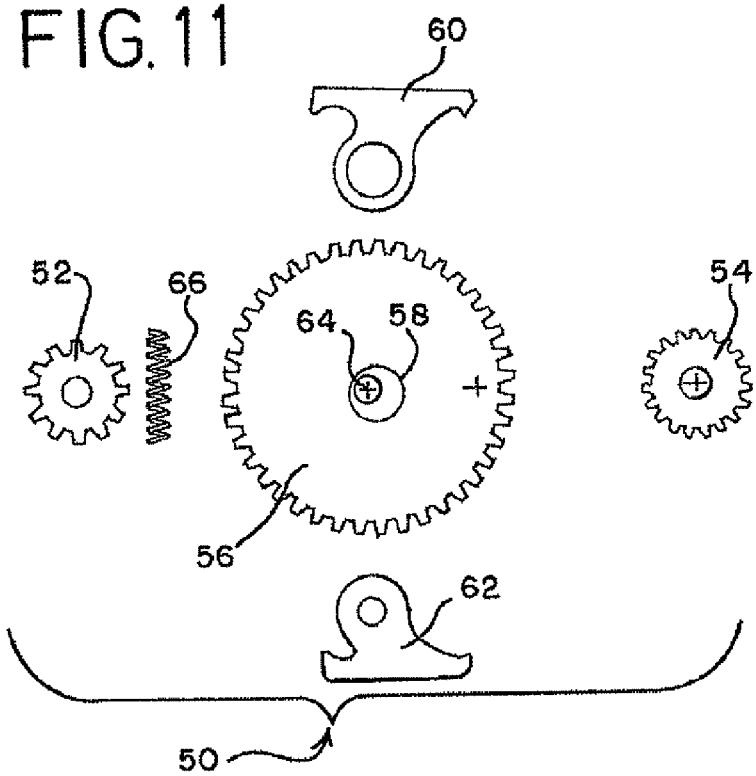

It is preferable that the transfer shaft 38 be rotated at a slower rate than the spool 22. Various drive mechanisms for accomplishing this result, such as those shown in Maynes U.S. Pat. No. 2,512,357, which is incorporated herein by reference. With reference to FIGS. 10 and 11, an improved level wind drive mechanism, generally designated 50, is shown. The level wind drive mechanism 50 comprises a first drive gear 52 secured to the spool shaft 20 so as to be rotatable therewith. The transverse shaft 38 of the level wind includes a second pinion gear 54 secured thereto. To rotate the transverse shaft of the level wind relative to the spool 22, an intermediate gear 56 is driven by the drive gear 52. The intermediate gear 56 includes an eccentric collar 58 to which an index pawl 60 is mounted, while a keeper pawl 62 is mounted to the shaft 64 of the intermediate gear 56. A spring 66 biases the teeth of the pawls 60, 62 into engagement with the teeth of the second pinion gear 54. Thus, for each revolution of the eccentric collar 58, the index pawl 60 is oscillated to disengage the pinion gear 54 to rotate the transverse shaft 38. The ratio of the gears 52, 54 and 56 is selected so that the crank handle 30 is turned from within 3 to 8 times to rotate the level wind so that the fishing line travels back and forth once (for a typical bass reel) and up to 20 turns of the crank handle for a salt water reel.

While the invention has been described in terms of certain preferred embodiments, other variations will become apparent to those skilled in the art. Thus, there is no intention to limit the invention the described embodiments. Instead, the invention is to be defined by the appended claims. The two examples given in the specification are meant to be illustrative, but not necessarily limiting, of the types of configurations for the level wind.

The invention claimed is:

1. A fishing reel comprising:

a pair of opposed side walls;

a spool holding fishing line rotatably supported between the side walls;

and a level wind for evenly winding the fishing line on the spool, the level wind comprising a transverse shaft rotatably secured between the side walls in front of the spool, the transverse shaft having a longitudinal axis and being adapted to be rotated about its longitudinal axis, the transverse shaft further having first and second collars at the opposed ends thereof having planar faces that are disposed obliquely with respect to the longitudinal axis and parallel with respect to each other, a central segment disposed between the collars obliquely with respect to the longitudinal axis, the central segment presenting a fishing line engagement surface with high and low points, and a transition segment between each opposed end of the central segment and its respective collar, each transition segment defining a line engaging surface that is oblique to both the planar faces of the collars and the central segment and is parallel to the line engaging surface of the other transition segment;

whereby upon rotation of the spool to reel in the fishing line, the transverse shaft rotates so that the high and low points of the central segment move back and forth in front of the spool to evenly wind the fishing line on the spool.

2. The fishing reel of claim 1 wherein the central segment of the transverse shaft comprises a substantially linear portion extending between the collars.

3. The fishing reel of claim 1 wherein the central segment extends substantially perpendicularly with respect to the planar faces of the collars.

4. The fishing reel of claim 1 wherein the transition segments define parallel planes to which the longitudinal axis of the transverse shaft is parallel.

5. The fishing reel of claim 1 wherein the transition segments are coplanar with respect to a longitudinal axis of the central segment.

6. A fishing reel comprising:

a pair of opposed side walls;

a spool holding fishing line rotatably supported between the side walls;

and a level wind for evenly winding the fishing line on the spool, the level wind comprising a transverse shaft rotatably secured between the side walls in front of the spool, the transverse shaft having a longitudinal axis and being adapted to be rotated about its longitudinal axis by the driving gear, the transverse shaft further having first and second collars at the opposed ends thereof, the collars having opposed planar faces, and a segment disposed between the planar faces of the collars obliquely with respect to the longitudinal axis, the oblique segment engaging the fishing line and presenting high and low points; wherein the collars are generally cylindrical and the planer faces are generally elliptically shaped;

whereby upon rotation of the spool to reel in the fishing line, the transverse shaft rotates so that high and low points of the oblique segment move back and forth in front of the spool to evenly wind the fishing line on the spool.

7. The fishing reel of claim 6 wherein the oblique segment of the transverse shaft comprises a substantially linear portion extending between the collars.

8. The fishing reel of claim 6 wherein the planar faces of the collars are parallel to each other, and the oblique segment extends substantially perpendicularly from the planar faces.

*9. A fishing reel comprising:*

*a pair of opposed side walls;*

*a spool holding fishing line rotatably supported between the side walls;*

*and a levelwind for evenly winding the fishing line on the spool, the levelwind comprising a transverse shaft rotatably secured between the side walls in front of the spool, the transverse shaft having a longitudinal axis and being adapted to be rotated about its longitudinal axis, the transverse shaft further having first and second collars at the opposed ends thereof, each collar having stub-shaft extending therefrom coincident with the longitudinal axis, a central segment extending between the collars disposed obliquely with respect to the longitudinal axis, the central segment presenting a fishing line engagement surface with high and low points, and a transition segment between each opposed end of the central segment and its respective collar, each transition segment defining a plane having a line engaging surface that is both oblique to the central segment and generally parallel to the plane defined by the other transition segment;*

*whereby upon rotation of the spool to reel in the fishing line, the transverse shaft rotates so that the high and low points of the central segment move back and forth in front of the spool to evenly wind the fishing line on the spool.*

*10. The fishing reel of claim 9 wherein the central segment of the transverse shaft comprises a substantially linear portion extending between the collars.*

*11. The fishing reel of claim 9 wherein the transition segments define parallel planes to which the longitudinal axis of the transverse shaft is parallel.*

*12. The fishing reel of claim 9 wherein the transition segments are coplanar with respect to a longitudinal axis of the transverse shaft.*

* * * * *